US009924768B1

(12) United States Patent
Rosenberger et al.

(10) Patent No.: US 9,924,768 B1
(45) Date of Patent: Mar. 27, 2018

(54) UMBRELLA WITH CROSSBEAMS AND TELESCOPING POLES

(71) Applicants: Yoel Rosenberger, Monsey, NY (US); Aron Kohn, Monsey, NY (US)

(72) Inventors: Yoel Rosenberger, Monsey, NY (US); Aron Kohn, Monsey, NY (US)

(*) Notice: Subject to any disclaimer, the term of this patent is extended or adjusted under 35 U.S.C. 154(b) by 0 days.

(21) Appl. No.: 15/371,585

(22) Filed: Dec. 7, 2016

Related U.S. Application Data

(60) Provisional application No. 62/266,190, filed on Dec. 11, 2015, provisional application No. 62/266,236, filed on Dec. 11, 2015.

(51) Int. Cl.
A45B 25/02    (2006.01)
A45B 11/02    (2006.01)
A45B 19/04    (2006.01)
B62J 17/08    (2006.01)

(52) U.S. Cl.
CPC .............. *A45B 25/02* (2013.01); *A45B 11/02* (2013.01); *A45B 19/04* (2013.01); B62J 17/08 (2013.01); B62J 2017/083 (2013.01)

(58) Field of Classification Search
CPC ......... A45B 11/02; A45B 25/02; A45B 19/04; A45B 23/00; E04H 15/28; E04H 15/06; E04H 15/48
USPC ................ 135/98, 88.04, 88.03, 16; 224/187
See application file for complete search history.

(56) References Cited

U.S. PATENT DOCUMENTS

| 49,605 A | * | 8/1865 | Clark | E04H 15/48 135/100 |
| 339,793 A | * | 4/1886 | Libbey | A45B 11/00 135/133 |
| 558,296 A | * | 4/1896 | McDonald | A01K 97/10 135/88.03 |
| 587,460 A | * | 8/1897 | Speer | A45B 11/02 224/187 |
| 616,903 A | * | 1/1899 | Crocker | A42B 3/322 135/96 |
| 736,373 A | * | 8/1903 | Feazell | A45B 11/02 224/187 |
| 880,176 A | * | 2/1908 | Swanwick | E04H 15/28 135/33.41 |

(Continued)

FOREIGN PATENT DOCUMENTS

GB    2406514 A  *  4/2005  ............. A45B 19/04
KR    101215137 B1 * 12/2012  ............. E04H 15/58

*Primary Examiner* — Robert Canfield
(74) *Attorney, Agent, or Firm* — Michael J. Feigin, Esq.; Feigin and Fridman LLC

(57) ABSTRACT

An umbrella has a vertical pole extending downward from the fabric region, but it also has horizontal poles extending outwards from this vertical pole. In addition, it has a plurality of further vertical poles extending downward from the horizontal poles. In this manner, the umbrella is supported by four, six, or more vertical poles. Any or all of the poles can be telescoping poles, such that they can be increased or decreased in length. The connection of the horizontal poles to a vertical pole above and/or below can also be rotatable connections which lock into place at 90 degrees, but through human force, can unlock to place the horizontal poles in parallel with a vertical pole above or below itself. In this manner, one can fold the umbrella over the poles and shorten the length and/or width of the device.

15 Claims, 7 Drawing Sheets

(56) References Cited

U.S. PATENT DOCUMENTS

| | | | | |
|---|---|---|---|---|
| 988,349 A * | 4/1911 | Jolley | ............... | E04H 15/06 135/124 |
| 1,128,558 A * | 2/1915 | Voorhies | ............... | A45B 23/00 135/155 |
| 1,217,542 A * | 2/1917 | Washington | ............... | A45B 11/02 224/187 |
| 1,469,111 A * | 9/1923 | Russell | ............... | A45B 11/02 135/87 |
| 1,534,820 A * | 4/1925 | Walmsley | ............... | A45B 7/005 135/74 |
| 2,015,321 A | 9/1935 | Shelton | | |
| 2,113,118 A * | 4/1938 | Pyatt | ............... | E04H 15/28 135/123 |
| 2,434,526 A * | 1/1948 | Thornton | ............... | A45B 11/02 135/16 |
| 2,530,765 A * | 11/1950 | Greenup | ............... | E04H 15/28 135/120.3 |
| 3,021,985 A * | 2/1962 | Sarver | ............... | A45B 11/02 224/187 |
| 3,407,825 A * | 10/1968 | Doyle | ............... | A45B 11/00 135/16 |
| 3,765,434 A * | 10/1973 | Riggs | ............... | A45B 7/005 135/16 |
| 5,353,977 A * | 10/1994 | Schiro, Jr. | ............... | A45B 11/02 135/16 |
| 5,706,531 A | 1/1998 | Aubertine | | |
| 6,776,179 B1 * | 8/2004 | Chen | ............... | E04H 15/42 135/135 |
| 7,111,633 B2 * | 9/2006 | Moroney | ............... | E04H 15/28 135/132 |
| 9,790,705 B2 * | 10/2017 | Lyon | ............... | E04H 15/48 |
| 2001/0035202 A1 * | 11/2001 | Moskowitz | ............... | A45B 11/02 135/16 |
| 2005/0011135 A1 | 1/2005 | Hallberg | | |
| 2008/0048413 A1 * | 2/2008 | Salinas | ............... | B62J 17/08 280/304.3 |

\* cited by examiner

UMBRELLA WITH CROSSBEAMS AND TELESCOPING POLES

FIELD OF THE DISCLOSED TECHNOLOGY

This invention is related to umbrellas and, more specifically, an umbrella with at least four vertical poles for placement into the ground or on an object.

BACKGROUND OF THE DISCLOSED TECHNOLOGY

Umbrellas are used as protection from rain and sun. They typically function by having a fabric or other flexible cover which is supported by a plurality of ribs or spines there-in. The ribs are held up, in turn, by other ribs or spines which extend from a central region, such as a hollow circular member which rises and falls on a vertical pole. When one raises the central region, the umbrella expands. When one lowers the central region, the umbrella collapses.

SUMMARY OF THE DISCLOSED TECHNOLOGY

An umbrella of embodiments of the disclosed technology has telescoping poles. A fabric portion (also referred to as a "fabric umbrella") is made up of flexible material which covers an area at the top side of the device. This portion has a plurality of equi-spaced outer spines on an underside of said fabric, the underside being a concave side thereof. An upper vertical pole extends from a central focal point of the concave side (defined a focal point of the partial sphere or ovoid structure enclosed by the fabric, or substantially at such a focal point) downward or perpendicular from this focal point. A plurality of inner spines each extend from an outer spine to a ring extending around the upper vertical pole. A junction region connects the upper vertical pole to a plurality of horizontal telescoping arms, wherein the plurality of horizontal telescoping arms is equi-spaced one from the other. A plurality of lower vertical poles in parallel with the upper vertical pole, each extends from a horizontal telescoping arm of the plurality of horizontal telescoping arms.

Each lower vertical pole of the plurality of lower vertical poles is a telescoping pole, in embodiments of the disclosed technology. In some embodiments, the horizontal telescoping arms are rotatable 90 degrees with respect to the junction region, until the horizontal telescoping arms are in parallel with the upper vertical pole and the plurality of lower vertical poles. The fabric umbrella is prevented from folding when the horizontal telescoping arms are perpendicular to the upper vertical pole, in some embodiments. This is due to abutment between at least one inner spine of the plurality of inner spines and a horizontal telescoping pole. In some embodiments, abutment between the fabric and a horizontal telescoping pole prevents the folding of the umbrella. This is alleviated (the umbrella can fold) by rotating the horizontal polls, so that they are vertical and no longer near the fabric, or by disconnecting the horizontal poles.

The fabric covers all of the horizontal poles, and at least a part of the lower vertical poles, in some embodiments. This occurs, for example, when the horizontal poles are rotated with respect to the upper vertical pole and the lower vertical poles, such that the horizontal poles and the lower vertical poles form a continuous line.

A flexible or rigid belt can extend around a bottom-most region of the lower vertical poles. This belt can be configured to extend around the waist of a person while holding the fabric umbrella above the person. The rigid belt can be crossbars which are at a bottom-most-region of the lower vertical poles and are attached to an object such as a bicycle, such that said fabric umbrella is above the object/bicycle.

The horizontal telescoping arms and the lower vertical poles have a narrowest region at adjacent sides to each other, in some embodiments.

Described another way, embodiments of the disclosed technology include a plurality of lower vertical poles equi-spaced apart which, in turn, are each rotatably attached to a respective horizontal pole of a plurality of horizontal poles. A junction region of a plurality of the horizontal poles attaches the plurality of horizontal poles to an upper vertical pole. A fabric umbrella extends over a width of the horizontal poles when the horizontal poles are fully extended (telescoped outwards as far as possible and/or designed to be telescoped in length/width). The horizontal poles and the lower vertical poles are telescoping poles.

A narrowest region of each horizontal pole and each lower vertical pole are rotatably connected, in some embodiments of the disclosed technology. In some embodiments, a widest region of each horizontal pole is attached to a holder at the junction region. The horizontal poles can be rotatable until the horizontal poles are in parallel with the upper vertical pole. When the horizontal poles are in parallel with the upper vertical pole, the fabric umbrella collapses to cover the plurality of horizontal poles in their entirety.

Crossbars attach a lowest-most end of each of said plurality of lower vertical poles to one another, in some embodiments. The crossbars can form a rectangle, and they can be rigid (not bendable with ordinary human force or when bent, causes deformation) or flexible (bendable with human force without causing deformation). The crossbars are fixedly connected to a plurality of receptacles with openings disposed upwards, in an embodiment. Each lower vertical pole of the plurality of lower vertical poles can then be situated within a respective receptacle attached to the crossbars, in one embodiment.

Any device or step to a method described in this disclosure can comprise, or consist of, that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

An umbrella has a vertical pole extending downward from the fabric region, but it also has horizontal poles extending outward from this vertical pole. In addition, it has a plurality of further vertical poles extending downward from the horizontal poles. In this manner, the umbrella is supported by four, six, or more vertical poles. Any or all of the poles can be telescoping poles, such that they can be increased or decreased in length. The connection of the horizontal poles to a vertical pole above and/or below can also be rotatable connections which lock into place at 90 degrees, but through human force, and can unlock to place the horizontal poles in parallel with a vertical pole above or below itself. In this manner, one can fold the umbrella over the poles and shorten the length and/or width of the device.

Embodiments of the disclosed technology are described below, with reference to the figures provided.

Figure 1:
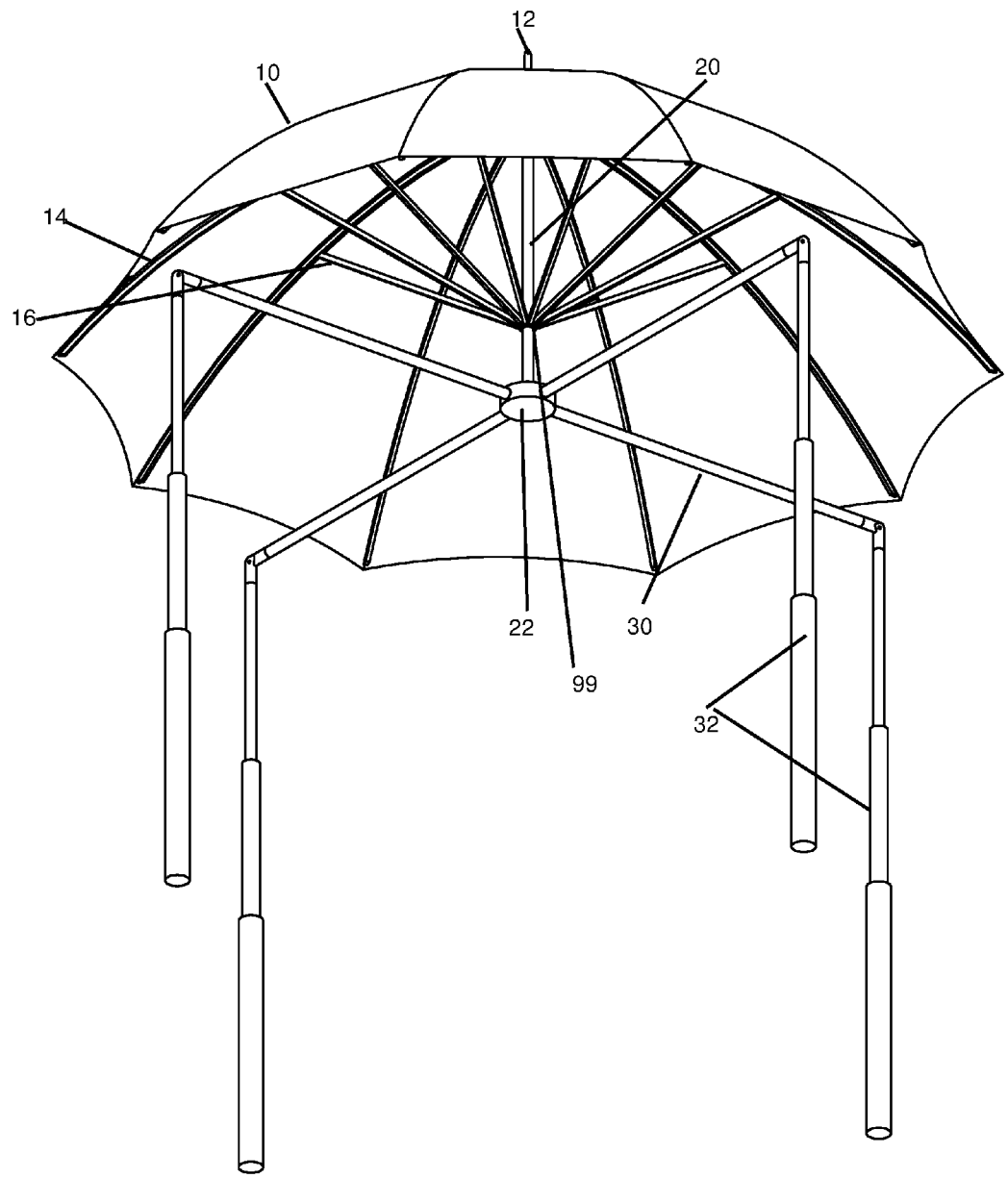
FIG. 1 is a lower perspective view of a first open umbrella, of an embodiment of the disclosed technology.

FIG. 1 is a lower perspective view of a first open umbrella, of an embodiment of the disclosed technology. This umbrella has four lower vertical poles 32 which are telescoping. Telescoping, for purposes of this disclosure, is defined as able to increase and decrease in length by placing one section of the item in a hollow region of another section. Further, there are horizontal poles 30 which can also telescope, in embodiments of the disclosed technology. The horizontal poles 30 each connect into a central region or junction box 22, such as the circular device shown in the figure. Depending on the embodiment, the junction box 22 allows the horizontal poles to bend upward or downward. The term "up" or "upward," for purposes of this disclosure, is defined by the way the device is normally used with the fabric 10 above the device it is covering and protecting from the sun or rain, and the end of the lower poles 32 which is farthest away from the fabric umbrella 10 and top spline 12 as being the "bottom".

An upper vertical pole 20 extends between (or through) the fabric umbrella 10 and the junction box 22. A plurality of inner spines each extend from an outer spine to a ring 99 extending around the upper vertical pole. It should be understood that the fabric umbrella 10 is any flexible material which is opaque or translucent. "Flexible" is defined as able to change shape at any given point throughout without ordinarily causing structural damage to the item whose shape has been changed. Conversely, "rigid" is defined as unable to change shape or position relative to another object to which the item is connected, without ordinarily causing structural damage. In this device, shown in FIG. 1, all items are rigid except for the flexible umbrella fabric 10 and spines 14 and 16, which have some bendability. Rigid items can change position with respect to one another.

The horizontal poles 30 can change their orientation relative to the junction box 22 and upper vertical pole 20, such that they are moved towards or away from the upper vertical pole 20, in addition to being telescoped to a shorter length. In addition, the junction point of each horizontal pole 30 with each respective lower vertical pole 32 can be changed in angle from the 90 degrees shown up to 180 degrees. As such, the horizontal poles are then at a 360 degree angle to the upper vertical pole 20 (in parallel, or substantially in parallel, therewith) and at a 180 degree angle to the lower vertical poles 32. While technically the horizontal poles 30 are no longer "horizontal" but are "vertical," the naming convention is kept for ease of understanding.

Still discussing FIG. 1, the umbrella fabric 10 folds as does a traditional umbrella with spines 16 extending from the vertical pole 20, which support spines 14 that are equi-spaced around the underside/interior of the fabric umbrella 10. These spines 14 and 16 cause the umbrella to open and close by way of pushing them up or down. This umbrella can rest on the ground by way of the bottom side of the four lower vertical poles 32 touching the ground or otherwise.

Figure 2:
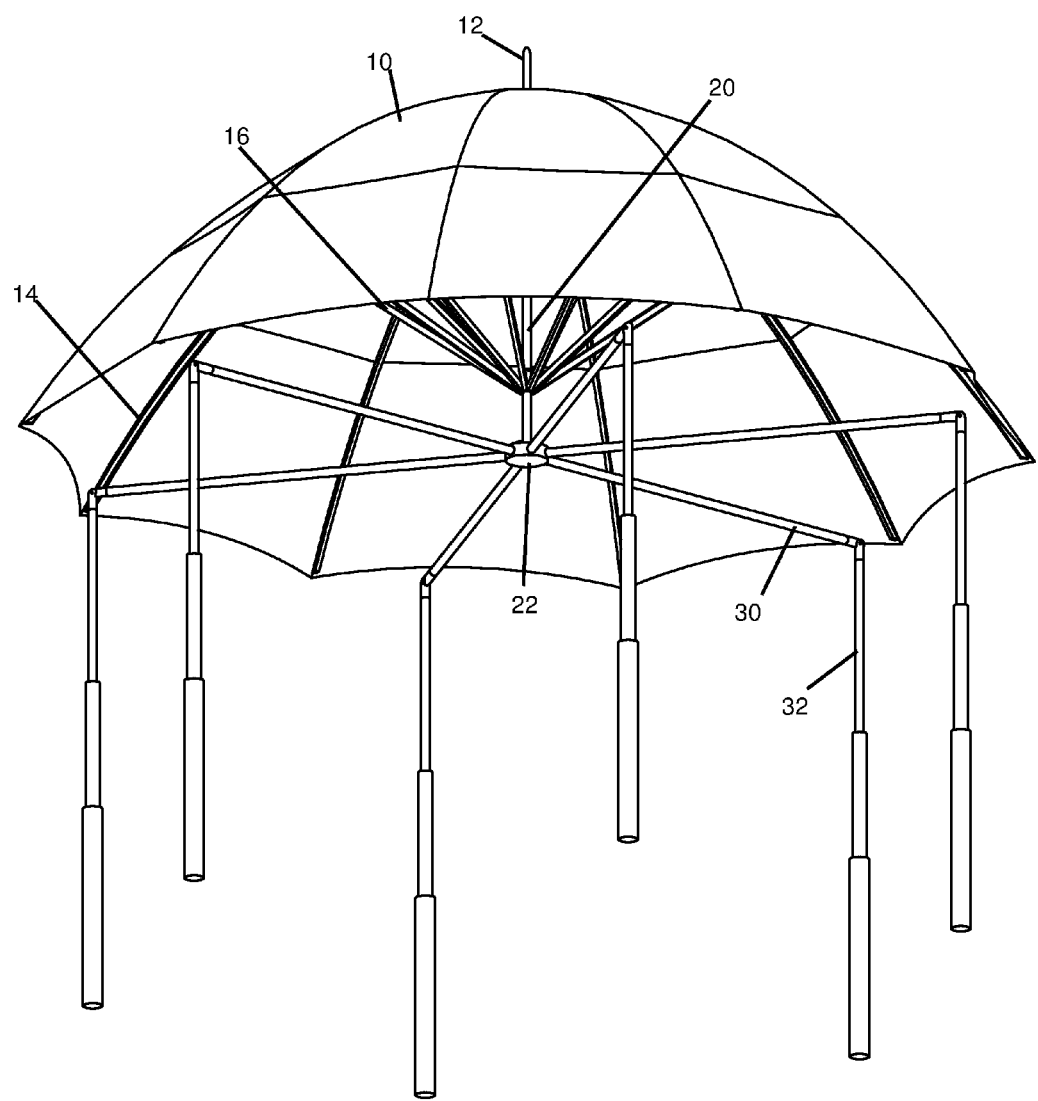
FIG. 2 is a lower perspective view of a second open umbrella, of an embodiment of the disclosed technology.

FIG. 2 is a lower perspective view of a second open umbrella, of an embodiment of the disclosed technology. In this variation, there are six lower vertical poles 32 and horizontal poles 30, instead of four, which can be used to support a larger umbrella, such as a beach umbrella having a span of 2, 3, or 4 meters.

Figure 3:
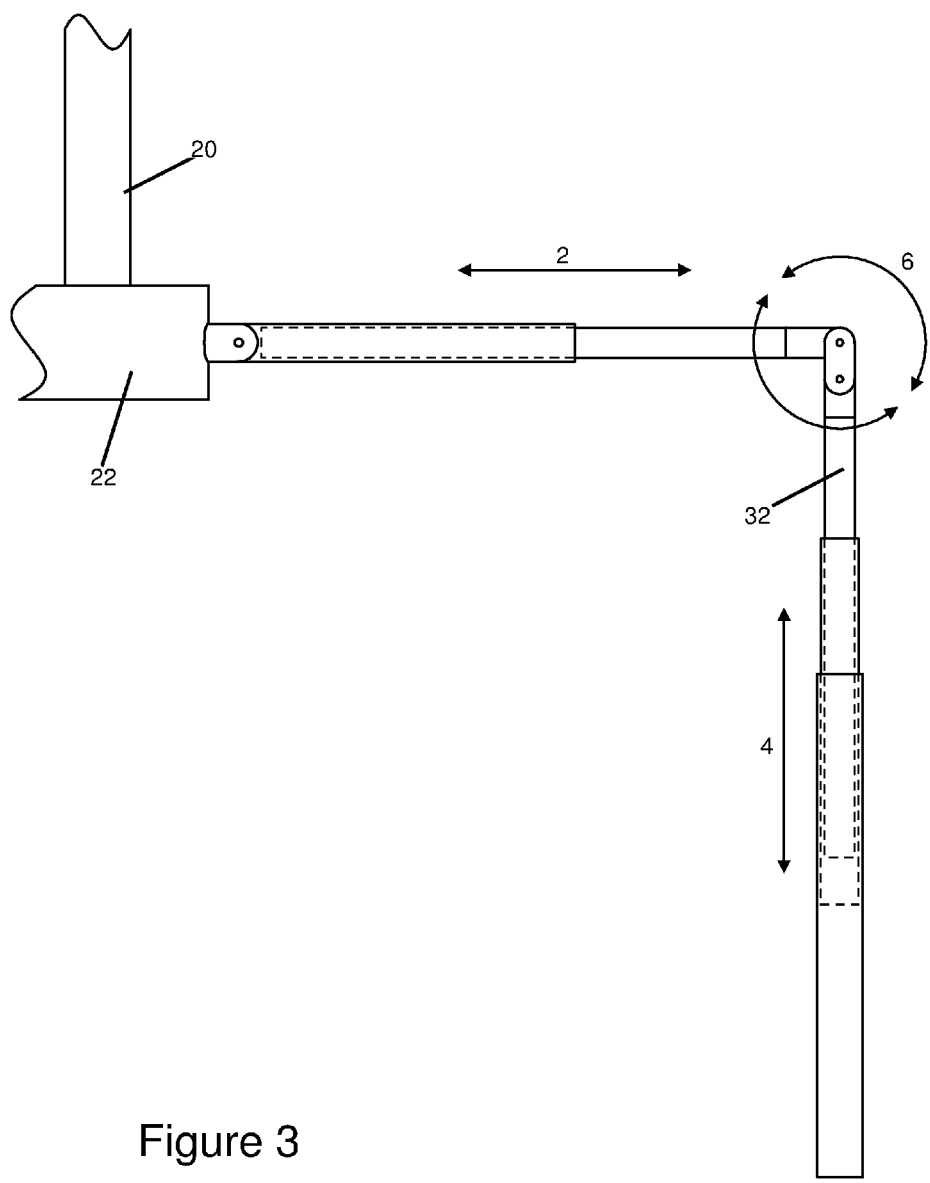
FIG. 3 is a close-up of a horizontal and vertical pole of an umbrella, of an embodiment of the disclosed technology, showing how the poles telescope.

FIG. 3 is a close-up of a horizontal and vertical pole of an umbrella, of an embodiment of the disclosed technology, showing how the poles telescope. This drawing further represents the junction of the upper vertical pole 20 with the horizontal pole. Using the label numbers shown, FIG. 3 is described as follows. The horizontal pole 30 can telescope to a greater or lesser length in a direction vector 2, as shown. The lower vertical pole 32 can telescope to a greater or lesser length in a direction vector 4, as shown. The two poles 30 and 32 can be locked at a 90 degree angle, as shown, or rotated in one or another direction 6 to change their angle. As such, they can be rotated to be 180 degrees (in-line with each other and extending across the paper) or 360 degrees (passing over or next to each other). In this manner, the width (extension in cardinal directions except upward and downward) of the umbrella can be lessened, while the vertical extent of the umbrella device increases, or vice versa. Further, in some embodiments, while the width of the umbrella decreases, the length also decreases, due to the retraction of the telescoping horizontal and vertical poles.

Figure 4:
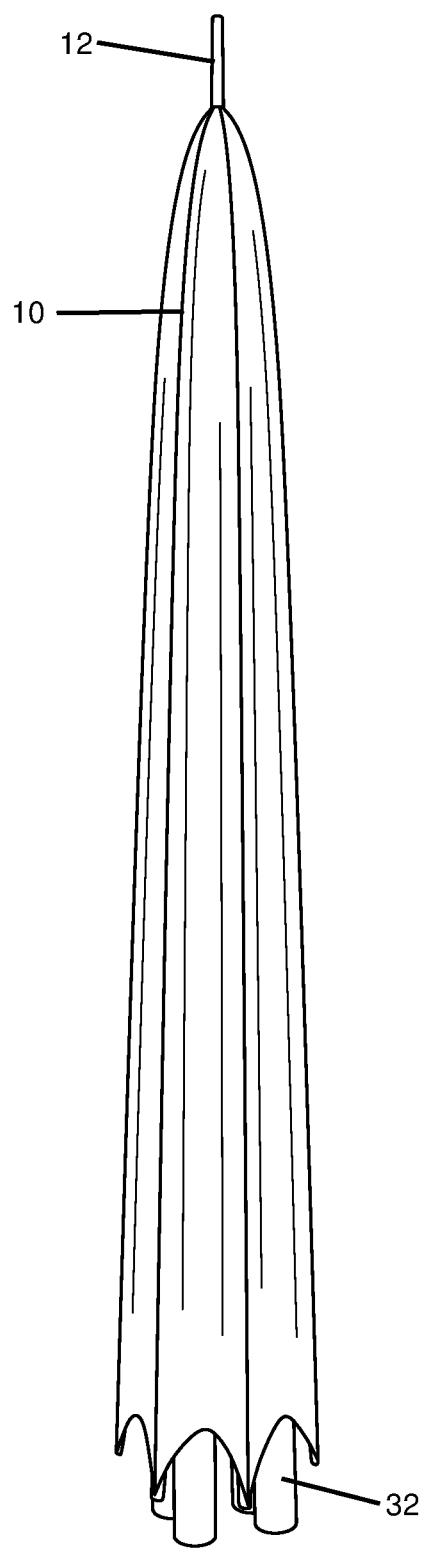
FIG. 4 is an upper perspective view of a closed umbrella, of an embodiment of the disclosed technology.

FIG. 4 is an upper perspective view of a closed umbrella, of an embodiment of the disclosed technology. Here, the lower-most portion of the lower poles 32 is exposed, but the rest of the poles 32, 30, and 20 are covered by the umbrella fabric 10, meaning that when viewing from the side, one sees only the fabric 10 and a minority of the lower vertical poles 32 when the fabric 10 is opaque.

Figure 5:
FIG. 5 shows an umbrella of an embodiment of the disclosed technology, supported by a belt worn on a person.

FIG. 5 shows an umbrella of an embodiment of the disclosed technology supported by a belt worn on a person. Here the lower end of the lower vertical poles 32 is inserted into a receptacle 82 which is, in turn, attached to a belt 80. Thus, the lower-most ends of each of the lower vertical poles 32 are attached to each other by way of a strap, in this embodiment, which is the belt 80 of the wearer.

Figure 6:
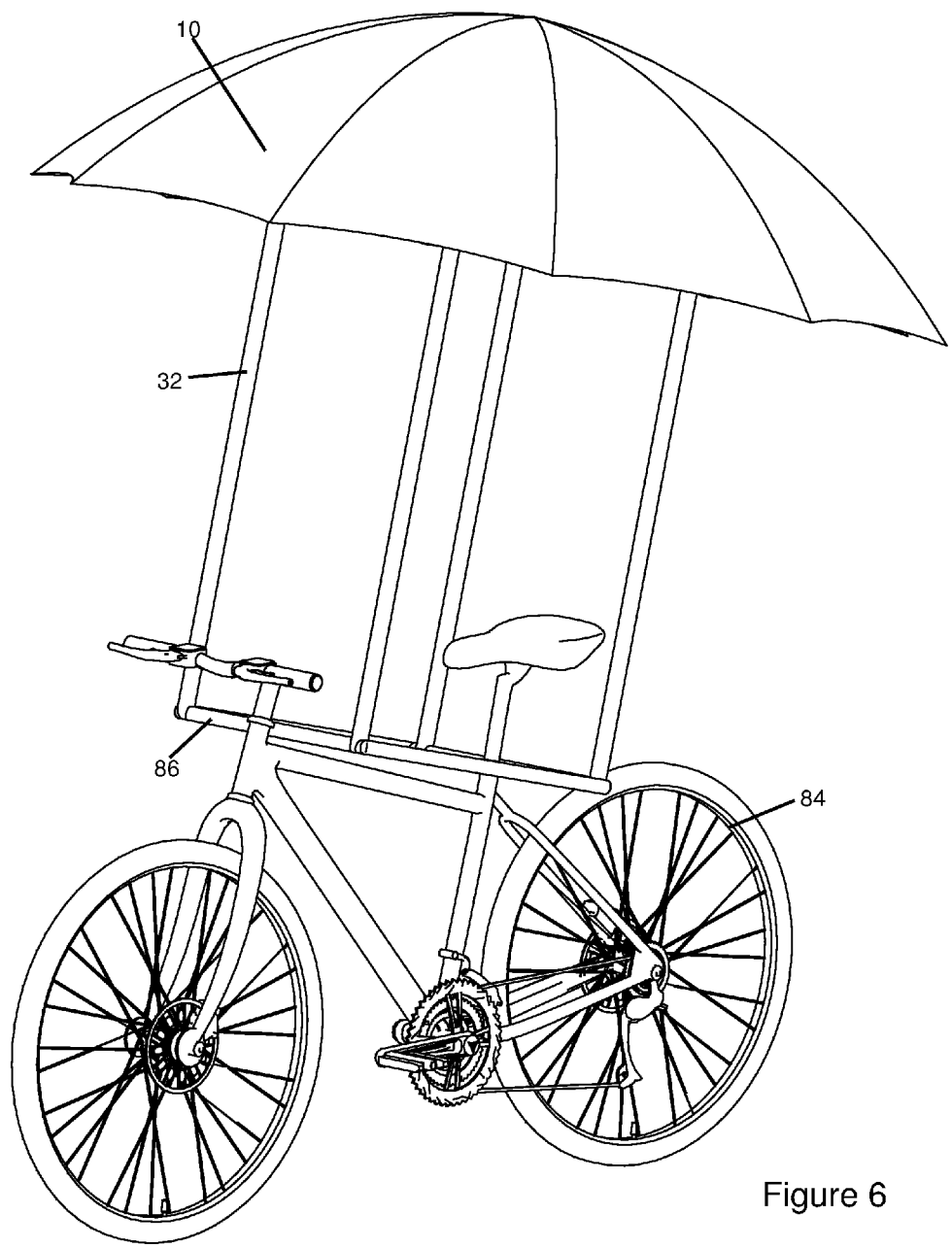
FIG. 6 shows an umbrella of an embodiment of the disclosed technology, supported by a bicycle.

FIG. 6 shows an umbrella of an embodiment of the disclosed technology supported by a bicycle. Here, the crossbars 86 are analogous to the strap 80 of FIG. 5. Thus, the umbrella can be attached to any device by way of creating a close rectangle around the bottom edges of the lower vertical poles 32, which is then supported by another device, whether it be a vehicle, person, or other object.

Figure 7:
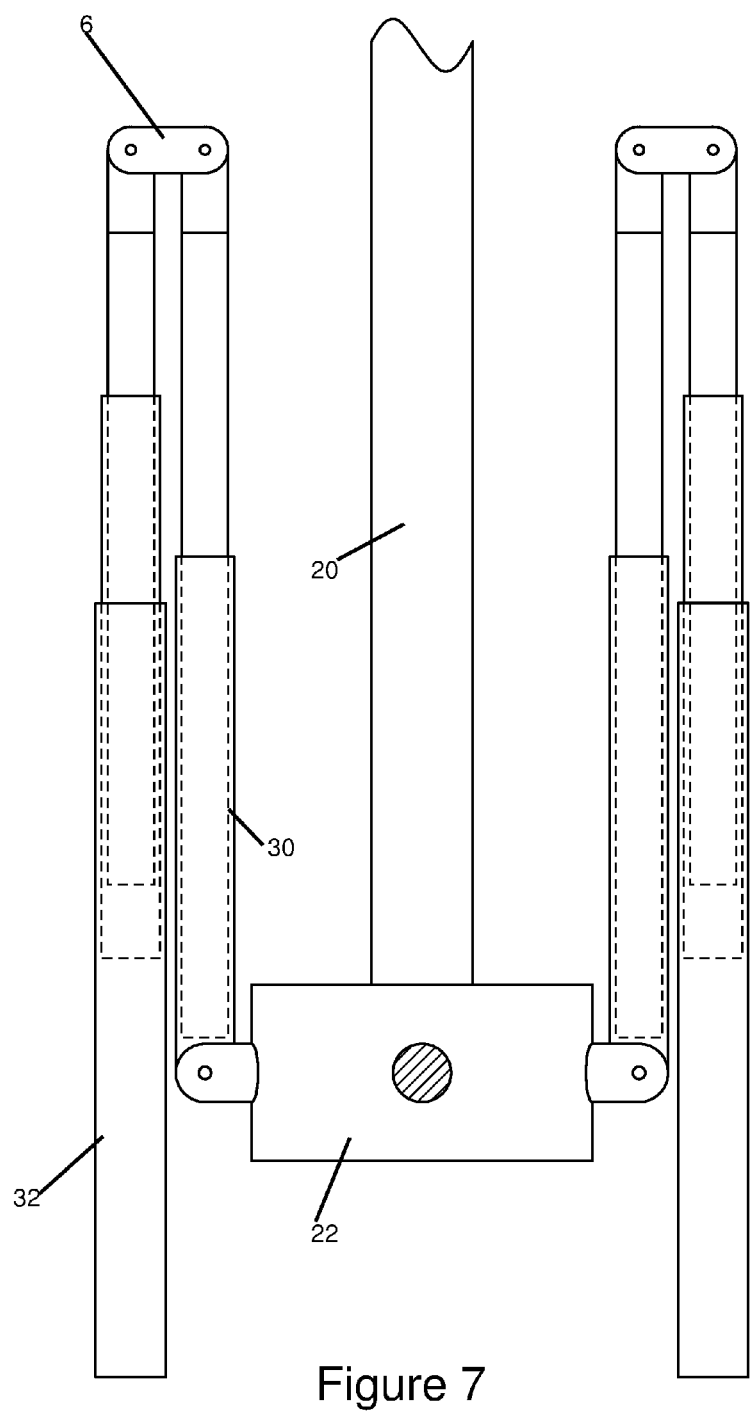
FIG. 7 shows the umbrella poles folded in an embodiment of the disclosed technology.

FIG. 7 shows the umbrella poles folded in an embodiment of the disclosed technology. The lower poles 32 are folded so that they are in parallel with the upper poles 30, bent along the joint or turning axis 6. In the folded condition, in this embodiment, the length of the umbrella from top to bottom is decreased not only by telescoping the poles inwards, but by folding them upwards. In other embodiments, the upper and lower pole extend in-line with one another forming on continuous length from bottom to top of the device, rather than folding and being next to each other, as shown in FIG. 6.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. An umbrella comprising:
   a fabric umbrella comprising a plurality of equi-spaced outer spines on an underside of said fabric, said underside being a concave side thereof;
   an upper vertical pole extending from a central focal point of said concave side;
   a plurality of inner spines each extending from an outer spine of said outer spines to a ring extending around said upper vertical pole;
   a junction region connecting said upper vertical pole to a plurality of horizontal telescoping arms, wherein said plurality of horizontal telescoping arms are equi-spaced from one another;
   at least four lower vertical poles in parallel with said upper vertical pole, each extending from a horizontal telescoping arm of said plurality of horizontal telescoping arms;
   wherein said horizontal telescoping arms are rotatable 90 degrees with respect to said junction region until said horizontal telescoping arms are in parallel with said upper vertical pole and said plurality of lower vertical poles.

2. The umbrella of claim 1, wherein each of said four lower vertical poles is a telescoping pole.

3. The umbrella of claim 2, wherein said fabric umbrella is prevented from folding when said horizontal telescoping arms are perpendicular to said upper vertical pole, due to abutment between at least one inner spine of said plurality of inner spines and a horizontal telescoping pole.

4. The umbrella of claim 2, wherein said fabric umbrella is prevented from folding when said horizontal telescoping arms are perpendicular to said upper vertical pole, due to abutment between said fabric and a horizontal telescoping pole.

5. The umbrella of claim 1, further comprising a flexible belt extending around a bottom-most region of said lower vertical poles.

6. The umbrella of claim 5, wherein said flexible belt is configured to extend around the waist of a person while holding said fabric umbrella above said person.

7. The umbrella of claim 1, wherein a bottom-most region of said lower vertical poles is attached to a crossbar, which is, in turn, attached to a bicycle, such that said fabric umbrella is above said bicycle.

8. The umbrella of claim 2, wherein said horizontal telescoping arms and said lower vertical poles have a narrowest region at adjacent sides to each other and wider regions at sides opposite said adjacent sides.

9. An umbrella comprising:
   a plurality of lower vertical poles equi-spaced apart which, in turn, are each rotatably attached to a respective horizontal pole of a plurality of horizontal poles;
   a junction region of a plurality of said horizontal poles attaching said plurality of horizontal poles to an upper vertical pole;
   wherein said horizontal poles and said lower vertical poles are telescoping poles; and
   wherein a narrowest region of a widening pole of each said horizontal pole and each said lower vertical pole are rotatably connected permitting rotation of said horizontal poles to between a completely vertical and completely horizontal orientation and a fabric umbrella extends over a width of said horizontal poles.

10. The umbrella of claim 9, wherein a widest region of each said horizontal pole is attached to a holder at said junction region.

11. The umbrella of claim 10, wherein said horizontal poles are rotatable until said horizontal poles are in parallel with said upper vertical pole.

12. The umbrella of claim 11, wherein, when said horizontal poles are in parallel with said upper vertical pole, said fabric umbrella collapses to cover said plurality of horizontal poles in their entirety.

13. The umbrella of claim 12, wherein crossbars attach a lowest-most end of each of said plurality of lower vertical poles to each other.

14. The umbrella of claim 13, wherein said crossbars form a rectangle.

15. The umbrella of claim 13, wherein said crossbars are rigid.

* * * * *